United States Patent

McAfee et al.

[11] Patent Number: 5,859,499
[45] Date of Patent: Jan. 12, 1999

[54] EMERGENCY LIGHTING SYSTEM WITH A DC SENSING LOAD RELAY

[75] Inventors: Robert McAfee, Whitby; Marnie E. Rycroft, Toronto; Morteza Showleh, Markham, all of Canada

[73] Assignee: Lumacell, Inc., Scarborough, Canada

[21] Appl. No.: 784,016

[22] Filed: Jan. 15, 1997

[51] Int. Cl.$^6$ .............................. H02J 9/06; H01H 47/32
[52] U.S. Cl. ................. 315/86; 307/66; 307/128
[58] Field of Search ............... 315/86, 324; 307/64, 307/66, 128

[56] References Cited

U.S. PATENT DOCUMENTS

| 2,777,074 | 1/1957 | Stockwell | 307/64 X |
| 4,349,863 | 9/1982 | Petersen | 315/86 X |
| 5,631,504 | 5/1997 | Adahan | 307/128 X |

FOREIGN PATENT DOCUMENTS

| 3319913 | 12/1984 | Germany | 315/86 |

OTHER PUBLICATIONS

Crippen, "Selecting and Applying Emergency Lighting Systems," Electrical Construction and Maintenance, pp. 58–64, Aug. 1977.

Primary Examiner—Robert Pascal
Assistant Examiner—Justin P. Bettendorf
Attorney, Agent, or Firm—Pepe & Hazard LLP

[57] ABSTRACT

An emergency lighting system has emergency light units operable by DC power and connected to a source of AC and DC power by the same conduit system. Power to the conduit system may be switched from AC to DC in the event of a power failure and a load relay module in the conduit system adjacent the light units senses the change to DC current and switches from an Ac load output to a DC load output to supply DC power to the emergency light units. The system will generally include both exit signs operable by both AC and DC power and emergency light units operable only by DC power.

12 Claims, 5 Drawing Sheets

EMERGENCY LIGHTING SYSTEM WITH A DC SENSING LOAD RELAY

BACKGROUND OF THE INVENTION

The present invention relates to emergency lighting systems, and, more particularly, to such systems permitting the use of existing wiring within the building to provide DC power to the units in such systems.

Emergency lighting systems are widely employed to illuminate buildings and to identify exits during interruptions of power supply. In many buildings (particularly of high rise construction), there is a central DC power supply consisting of a 120V DC charger and battery bank. A number of incandescent lighting heads are located throughout the building to provide an emergency lighting system to illuminate pathways for exit purposes when there is a power failure.

Some exit signs contain batteries to operate the lamp in the event of failure of the AC power which is powering the lamp. The AC power supply is charging the battery to keep it up to strength, but, over a period of time, the battery may deteriorate and render the unit ineffective in the event of failure. Moreover, decaying batteries will occasionally leak so as to cause deterioration of the entire sign unit. Thus, there has been a trend to power the exit signs from a central DC power source in the event of power failure or continuously.

In many large installations, there are two separate pairs of wires feeding lighting units in the emerging lighting system. AC power is normally supplied to the lamps of the exit signs through one pair of wires. DC power can be supplied to the DC lamps of the exit signs through the second set of wires from a battery bank and the emergency lighting heads are also supplied power thereby.

So long as there is AC power, a pair of contacts are normally closed in the AC circuit to provide power to the AC pair, and, in the event of a power failure, these contacts open and a pair of contacts in the DC circuit are closed to supply DC power through the DC line. Normally, the AC power source is also charging the battery bank. Such a system is illustrated in FIG. 1.

Although such a pair of two wire circuits may be readily installed in new construction, it is far more difficult to do so in existing buildings without incurring great cost. This type of installation increases the cost of a system because of the need to have a second set of wires to carry the different power supplies. This requirement increases the cost of new construction but presents a far more significant problem in existing buildings because conduits must be run throughout the building. Such conduits typically can be installed only with extensive drilling through concrete floors and walls with attendant high cost. In addition, exposed conduits are aesthetically displeasing and often unacceptable. A second problem is that many exit signs utilize fluorescent lamps which will not operate with an emergency DC power supply, and therefore require installation of a set of exit signs that can operate under AC and DC power. Accordingly, it is an object of the present invention to provide a novel emergency lighting system that enables the use of a single pair of wires to provide both AC and DC power to the light units and thereby reduce the cost and aesthetic impact of providing a separate DC power system.

It is also an object to provide such a system which will accommodate both fluorescent and incandescent lamp loads.

Another object is to provide such a system which will operate the heads of emergency light units only in the event of power failure.

A further object is to provide a novel relay for use in such system to switch between AC and DC.

SUMMARY OF THE INVENTION

The term "emergency light units" as used herein includes both exit signs which are operable continuously on AC and DC power and conventional emergency light units which have light heads operable only by DC power.

It has now been found that the foregoing and related objects may be readily attained in an emergency lighting system which has a multiplicity of emergency light units having lamps operable by DC power, an electrical conduit system connected to the light units and to sources of AC and DC power, and means for switching the power supply of the conduit system from AC to DC power in the event of failure of the AC power source. Load relay modules are provided in the conduit system adjacent the light units, and they have terminals connected to the conduit system, a pair of DC load terminals and a pair of AC load terminals. It senses a change from AC to DC power to the input terminals and switches the power supply from the AC load terminals to the DC load terminals to supply DC power to the DC light units.

The light units may include exit signs with lamps which are powered by AC and DC, or units containing both a DC powered lamp and an AC powered fluorescent lamp. The system will generally include emergency lighting units powered by DC current connected to the DC load terminals of the load relay module.

The load relay module includes a circuit board with a pair of input terminals, a pair of DC output terminals, and a pair of AC output terminals. A sensor component on the circuit board differentiates between AC and DC current across the input terminals, and a switching component under control of the sensor switches the current from the AC output terminals to the DC output terminals.

The sensor comprises a capacitor, and the switching component is a load relay. The load relay module generally includes a housing, and the circuit board is within the housing and has the switching and sensor components mounted thereon.

DETAILED DESCRIPTION OF THE PREFERRED EMBODIMENT

Figure 2:
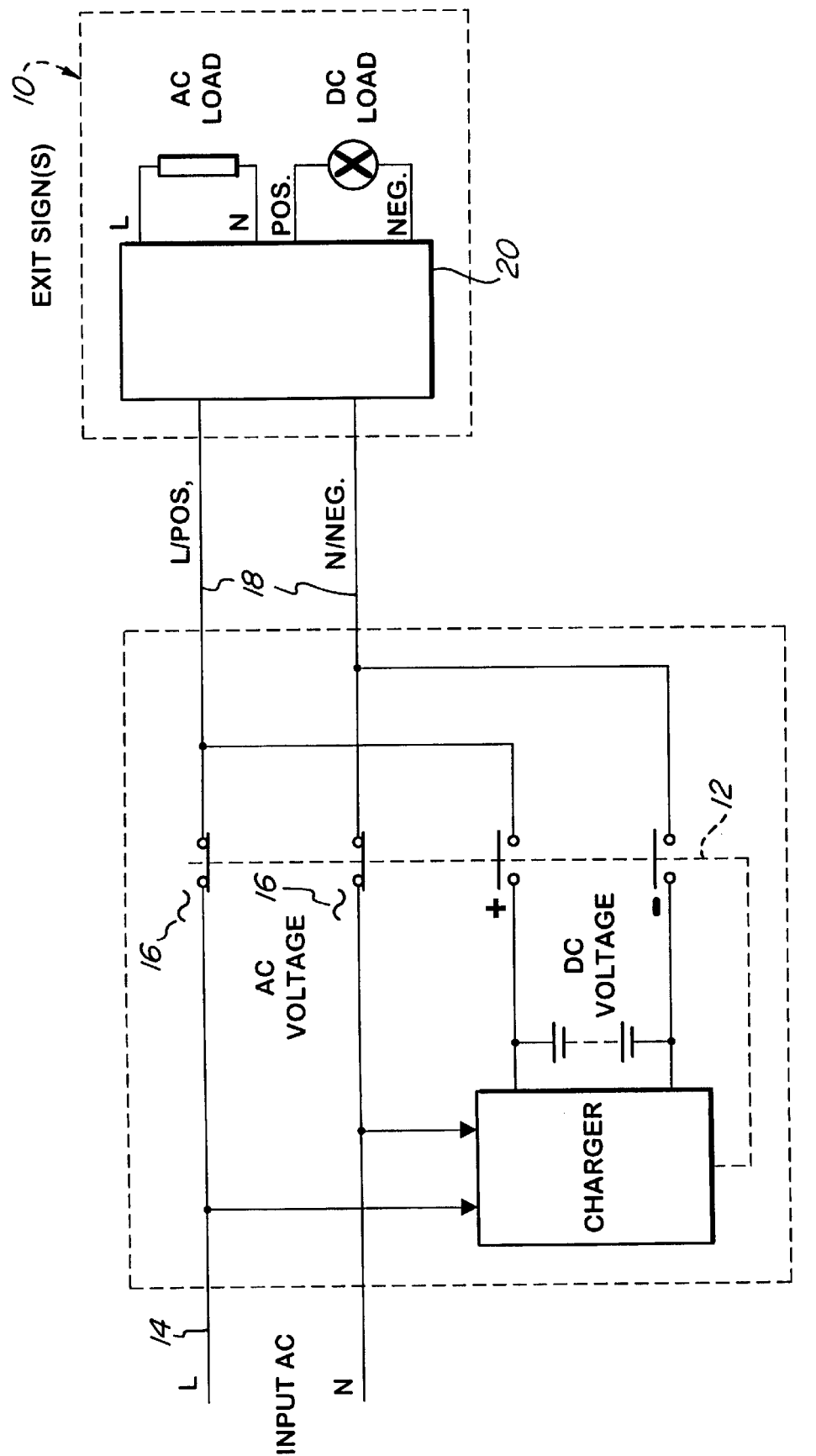
FIG. 2 is a schematic diagram of an emergency lighting system embodying the present invention.

Turning first to FIG. 2, therein schematically illustrated is a building installation having a multiplicity of light units 10 at strategic locations, a DC power supply 12 such as a battery bank, an AC power supply 14, a transfer contactor 16 for switching between the DC and AC power supplies 12,14, and a conduit system 18 between the output terminals of the contactor 16 and the relay load modules 20 coupled to the light units 10. Each of the exit signs 10 has a DC powered light load and an AC powered light load (not shown) which may be a single incandescent lamp operable by both AC and DC power. In the event of a failure of the AC power supply, a relay (not shown) operates the contactor 16 to provide DC power to the conduit 18. The relay load module 20 senses the change in power and switches its output to the DC powered load in the light unit 10, thus maintaining illumination of the light unit in the event of an AC power failure.

Figure 3:
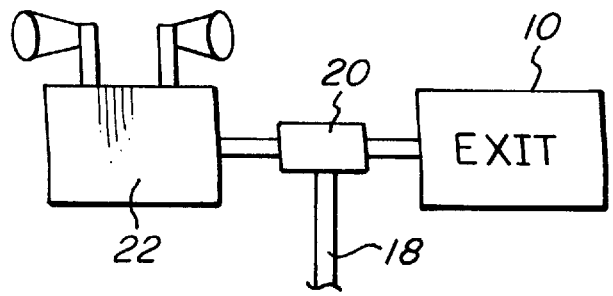
FIG. 3 is a schematic illustration of a combined installation of an emergency lighting unit and an exit sign.

Turning next to FIG. 3, therein diagrammatically illustrated is an installation of a DC powered emergency light unit 22 and an exit sign 10, both of which are supplied with power through the relay 20. The emergency light unit 22 is powered only when the relay load module 20 switches to a DC power output since its load is connected to the DC output while the exit sign 10 has connections from its AC powered load to the AC output terminals and from its DC powered load to the DC output terminals.

Figure 4:
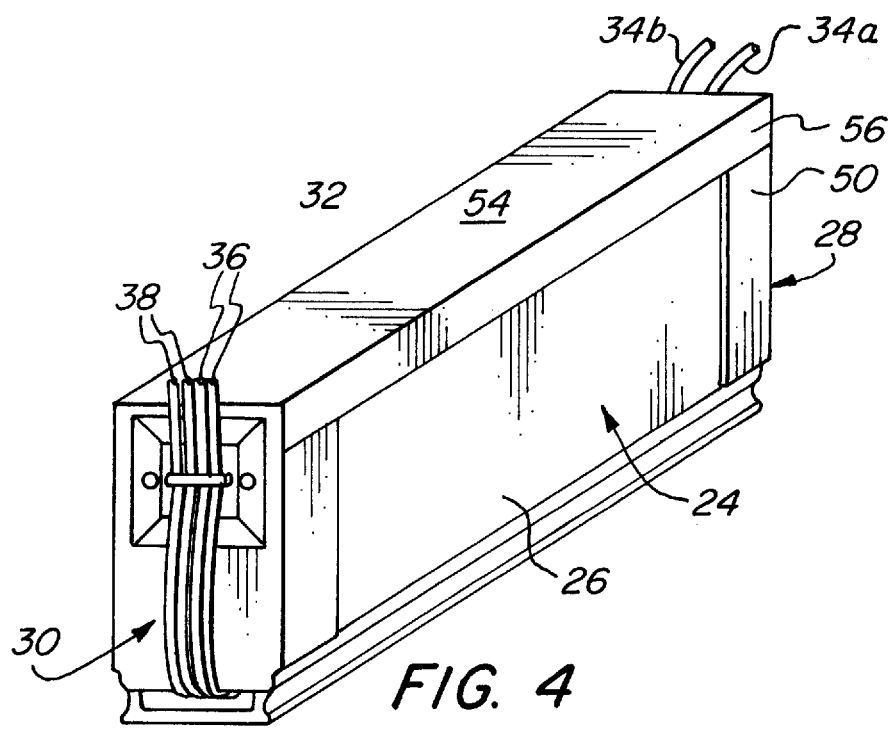
FIG. 4 is a perspective view of a load relay module employed in the present invention.

Turning next to FIG. 4, therein illustrated is a 120 V AC/DC relay load module 20 embodying the present invention. It has a housing generally designated by the numeral 24 which is comprised of the base mounting channel 26, the power supply side cap 28, the load side end cap 30, and the top cap 32. Entering the supply end of the housing 24 is a pair of AC/DC supply wire leads 34a;34b and exiting the load end are the two pairs of AC and DC load wire leads 36,38, respectively.

Figure 5:
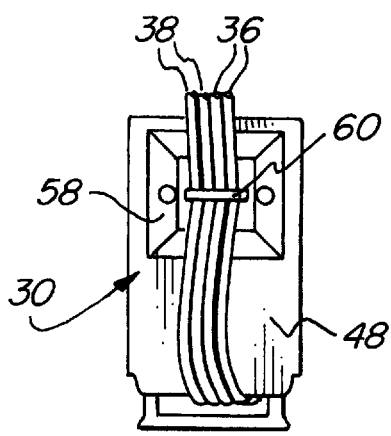
FIG. 5 is an end elevational view of the output end of the load relay module.
Figure 6:
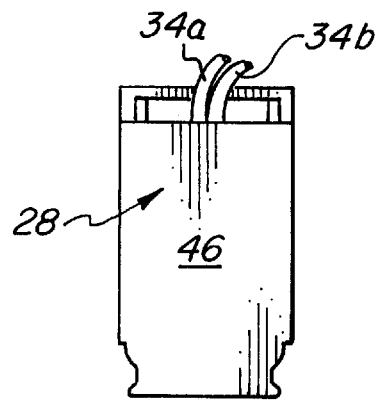
FIG. 6 is an elevational view of the input end of the load relay module.
Figure 7:
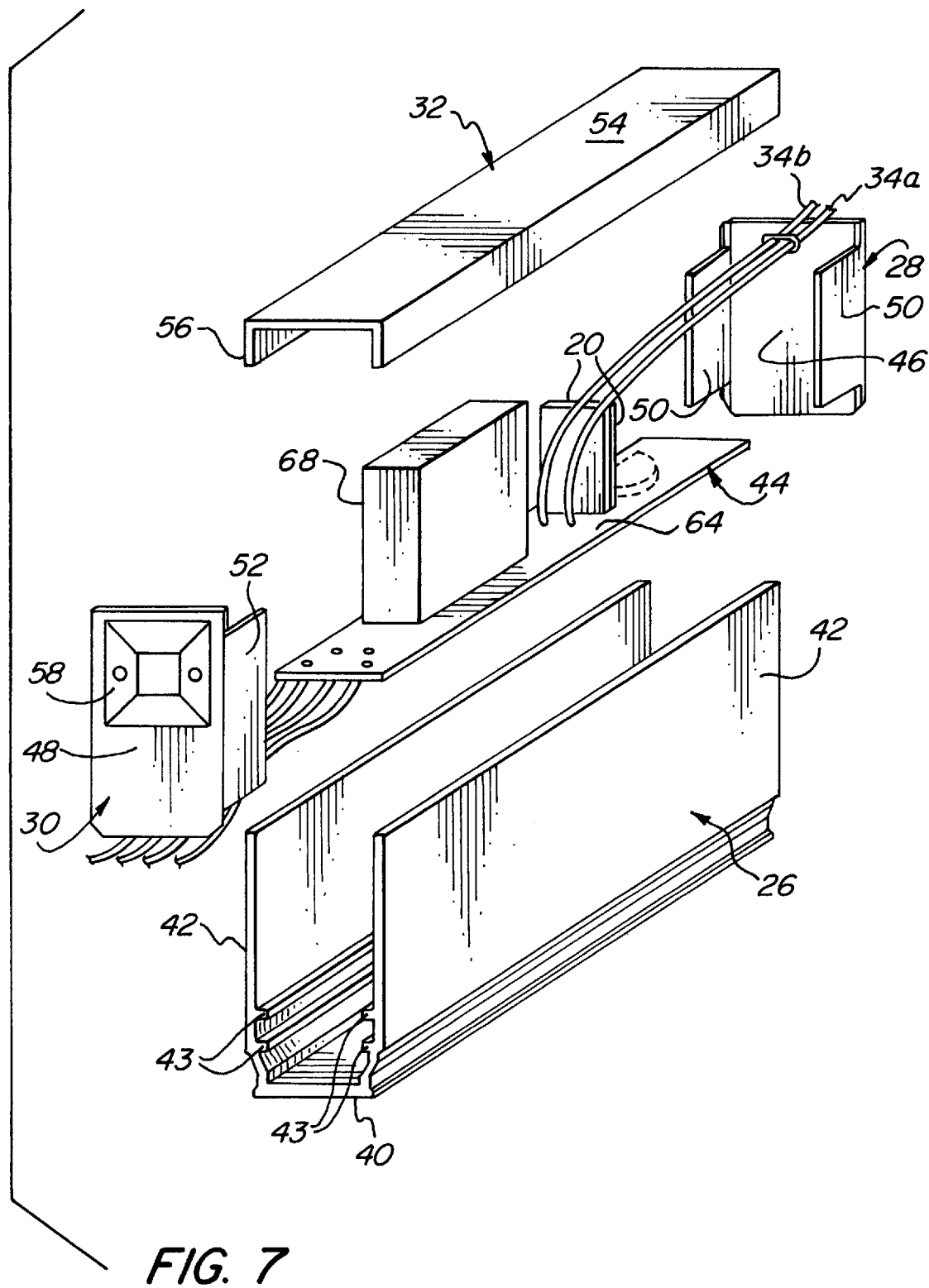
FIG. 7 is an exploded view of the components of the load relay module.

Turning next in detail to FIGS. 5–7, it is seen that the base mounting channel 26 is readily formed as an elongated extrusion with a base wall 40 and side walls 42 with a pair of vertically spaced ribs 43 extending longitudinally on the inner surface of the side walls 42, and as seen in FIG. 7, the printed circuit board assembly generally designated by the numeral 44 is snugly seated between the ribs 43. The end caps 28,30 each have a respective end wall 46,48 and side walls 50,52 which snugly tit over the ends of the base channel 26. Similarly, the top cap 32 has a top wall 54 and depending walls 56 which snugly fit over the side walls 42, thus providing a simple but rugged assembly.

The side walls 50,52 of the end caps 28,30 are of lesser height than the end walls 46,48 to allow the sldewalls 56 of the cap 32 to nest therewith on the side walls 42 of the base channel 20. The end walls 48,50 are also of lesser height than the base channel 26 to allow the AC/DC input leads 34 and the AC and DC load 36,38, respectively, to enter the housing 24 thereover and thereunder.

As seen in FIGS. 4 and 5, the load end cap 30 has a rectangular tie pad 58 thereon to which the load leads 36,38 are secured by a tie wrap 60. As seen in FIG. 5, a tie wrap 62 around the AC/DC leads 36,38 inside the housing 24 provides a strain relief to protect their connections to the circuit board assembly 44. The end caps 28, 30 and the top are adhesively bonded to the side walls 42 of the base mounting channel 26.

Mounted on the circuit board 64 of the circuit board assembly 44 are a load relay 68 and the electronic components 68,70. The leads 34, 36, 38 are soldered to terminals on the board 64 which has a printed circuit thereon communicating between the several components.

Figure 1:
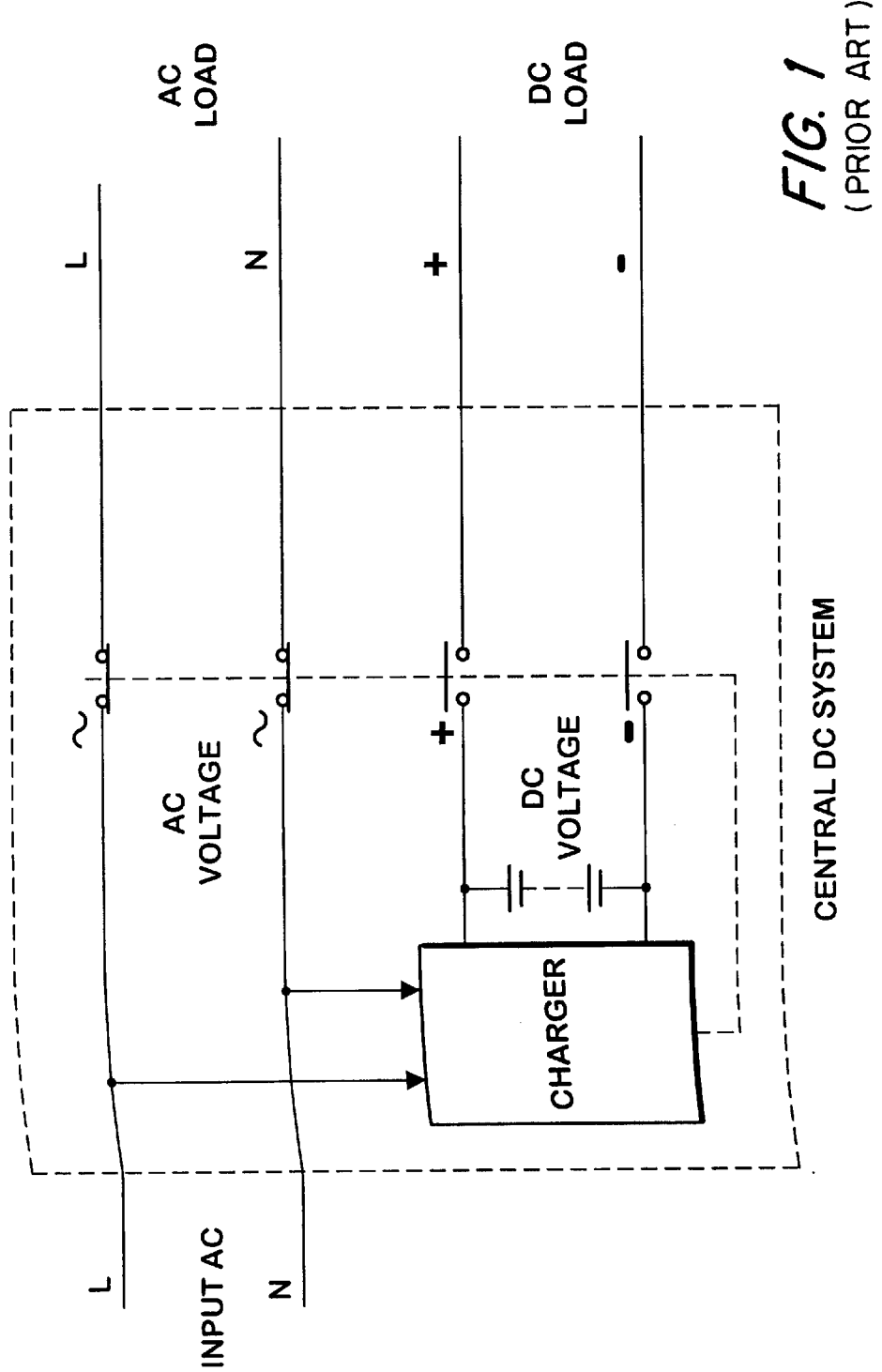
FIG. 1 is a schematic diagram of an emergency lighting system with separate AC and DC circuits.
Figure 8:
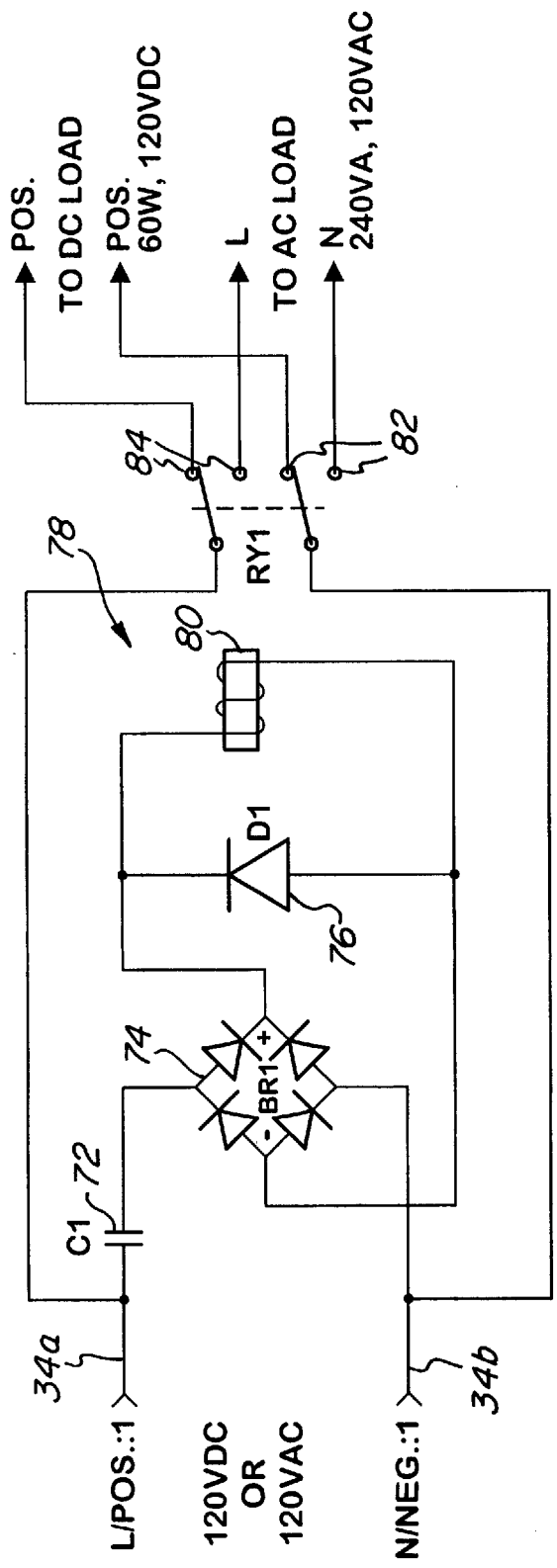
FIG. 8 is a schematic diagram of the circuitry of the load relay module.

As seen in FIG. 8, the components in the relay module include the capacitor 72 in the positive lead 34a, the bridge rectifier 74, the diode 76, a relay 78 which has a coil 80 and two pairs of contacts 82,84. With the input leads 34 carrying AC voltage, the capacitor 72 passes AC current through it and the bridge rectifier 74 converts the AC voltage to DC voltage, thus energizing the coil 80 of the relay 78 and connecting the AC load the input leads 34 through its normally open contacts 82. When the input leads 34 to the AC/DC load relay module carry DC voltage due to an AC failure in the central system and operation of the transfer contractor 16 as shown in FIG. 1, the capacitor 72 due to its nature blocks the DC voltage and thus deenergizes the coil 80 of the relay 78. In this case, the DC load is supplied by the input DC voltage through the normally closed contacts 84 of the relay 78. The diode 76 is a free-wheeling diode through which the magnetic energy stored in the coil 80 of the relay 78 is dissipated, thus eliminating any voltage spike which otherwise might have been generated when the relay 78 is being deenergized.

The housing is readily fabricated from synthetic resin such as polyvinyl chloride, polycarbonate, ABS and the like. Although the several components may be molded, lengths of the desired configuration may be extruded and cut to provide the desired notching for interfitting the caps.

As will be appreciated, the relay module may be fabricated in a miniature size so that it may be inserted into the housing of an exit sign or it may be mounted on the wall or ceiling adjacent the exit sign and emergency light units. It is easily mounted within an exit sign housing by double-faced adhesive tape. It can be mounted on the wall or ceiling by a bracket which will slidably seat the base of the housing.

By use of the present invention, existing buildings may be readily fitted with emergency lighting units which are powered only by a remote DC power source using the electrical wiring system already in place. Moreover, the batteries in exit signs which are normally charged by the AC current supply can be removed and the DC power supplied directly to the DC load in the unit. Removal of the battery and charging circuitry provides ample space for incorporating the relay load module.

Thus, it can be seen from the foregoing detailed specification and attached drawings that the emergency lighting system of the present invention is one which is readily installed in existing buildings and in new construction to provide AC/DC power over the same wiring to exit signs and DC power to emergency lights. The relay load module is simple to fabricate, is relatively low cost and can be easily installed.

Having thus described the invention, what is claimed is:

1. In an emergency lighting system, the combination comprising:

(a) a multiplicity of emergency light units having lamps operable by DC power;

(b) an electrical conduit system connected to said light units and to sources of AC and DC power;

(c) means for switching the power supply to said conduit system from AC to DC power in the event of failure of said AC power source; and (d) a load relay module in said conduit system adjacent said light units and having a pair of input terminals connected to said conduit system, a pair of DC load terminals and a pair of AC load terminals, said load relay module sensing a change from AC to DC power to said input terminals and switching the power supply from said AC load terminals to said DC load terminals and to supply DC power to said DC light units, said load relay module isolating said DC load terminals during flow of AC current thereto, whereby said DC operable lamps are not powered while AC current flows to said module.

2. The emergency lighting system in accordance with claim 1 wherein said light units include exit signs with lamps which are powered by AC and DC.

3. The emergency lighting system in accordance with claim 1 wherein said exit signs include a DC powered lamp connected to said DC load terminals and an AC powered fluorescent lamp connected said AC terminals.

4. The emergency lighting system in accordance with claim 1 wherein said system includes emergency lighting units powered only by DC current connected to the DC load terminals of said load relay module.

5. The emergency lighting system in accordance with claim 1 wherein said load relay module includes:
   (a) a circuit board with a pair of input terminals, a pair of DC output terminals, and a pair of AC output terminals;
   (b) a sensor component on said circuit board for differentiating between AC and DC current across said input terminals; and
   (c) a switching component under control of said sensor for switching the current from said AC output terminals to said DC output terminals in the event of failure of AC current.

6. The emergency lighting system in accordance with claim 5 wherein said sensor comprises a capacitor.

7. The emergency lighting system in accordance with claim 5 wherein said switching component is a load relay.

8. The emergency lighting system in accordance with claim 7 wherein said relay has a coil powered by current passing through a rectifier.

9. The emergency lighting system in accordance with claim 5 wherein said load relay module includes a housing and said circuit board is within said housing and has said switching and sensor components mounted thereon.

10. A load relay module for installation in power line to an emergency light unit, said module comprising:
   (a) a circuit board with a pair of input terminals, a pair of DC output terminals, and a pair of AC output terminals;
   (b) a bridge rectifier on said circuit board:
   (c) capacitor on said circuit board connected to said input terminals and to said bridge rectifier functioning as sensor component for differentiating between AC and DC current across said input terminals and allowing AC current to flow to said bridge rectifier while blocking DC current flow thereto, said rectifier rectifying AC current to DC current; and
   (d) a load relay functioning as a switching component under control of said capacitor sensor for switching the flow of current from said AC output terminals to said DC output terminals, said load relay having a coil which is energized by current flowing from said bridge rectifier to allow flow of AC current to said AC output terminals, said coil being deenergized when DC current is blocked by said capacitor sensor and said relay switches to close said DC output terminals.

11. The load relay module in accordance with claim 10 wherein said load relay module includes a housing and said circut board is within said housing and has said switching and sensor components mounted thereon.

12. The load relay module in accordance with claim 10 in which a freewheeling diode is connected across said coil to dissipate magnetic energy in said coil when said relay is deenergized.

* * * * *